(12) United States Patent
Seo et al.

(10) Patent No.: US 9,588,671 B2
(45) Date of Patent: Mar. 7, 2017

(54) PORTABLE APPARATUS COMPRISING TOUCH SCREENS FOR BROWSING INFORMATION DISPLAYED ON SCREEN OF EXTERNAL APPARATUS AND METHOD FOR BROWSING INFORMATION THEREOF

(71) Applicant: Samsung Electronics Co. Ltd., Suwon-si, Gyeonggi-do (KR)

(72) Inventors: Seok-ho Seo, Suwon-si (KR); Ki-suh Ahn, Seoul (KR); Hye-jung Yang, Busan (KR); Kyung-soo Lim, Hwaseong-si (KR); Eun-hee Rhim, Yongin-si (KR); Jin-ha Jun, Seoul (KR); Sie-joon Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 265 days.

(21) Appl. No.: 13/868,797

(22) Filed: Apr. 23, 2013

(65) Prior Publication Data

US 2013/0283177 A1   Oct. 24, 2013

(30) Foreign Application Priority Data

Apr. 24, 2012   (KR) .................. 10-2012-0042718

(51) Int. Cl.
 *G06F 3/048*    (2013.01)
 *G06F 3/0488*   (2013.01)
(52) U.S. Cl.
 CPC ........ *G06F 3/0488* (2013.01); *G06F 3/04883* (2013.01)

(58) Field of Classification Search
 CPC ...... G06F 3/0488; G06F 3/04883; G06F 1/26; G06F 1/266
 See application file for complete search history.

(56) References Cited

U.S. PATENT DOCUMENTS

| 8,225,364 B2 | 7/2012 | Jeon |
| 2008/0168514 A1 | 7/2008 | Jeon |

(Continued)

FOREIGN PATENT DOCUMENTS

| EP | 2 530 947 A2 | 12/2012 |
| JP | 2008-42481 A | 2/2008 |

(Continued)

*Primary Examiner* — Linh K Pham
(74) *Attorney, Agent, or Firm* — Jefferson IP Law, LLP

(57) ABSTRACT

A portable apparatus comprising a touch screen for browsing information displayed on a screen of an external apparatus and a method for browsing information thereof are provided. The method includes displaying a link area included in the web page displayed on the screen of the external apparatus on the touch screen of the portable apparatus, in response to a first gesture of a user on the touch screen, magnifying the link area displayed on the touch screen, and in response to a second gesture of the user on the magnified link area transmitting information regarding displaying another web page related to the link area on the screen of the external apparatus from the portable apparatus to the external apparatus. Accordingly, users may browse information displayed on a screen of an external apparatus using a portable apparatus having a touch screen swiftly and conveniently.

7 Claims, 17 Drawing Sheets

(56) References Cited

U.S. PATENT DOCUMENTS

| | | | |
|---|---|---|---|
| 2009/0296331 A1* | 12/2009 | Choy | G06F 1/1616 361/679.09 |
| 2011/0199286 A1* | 8/2011 | Dziama | G09B 27/06 345/82 |
| 2012/0011535 A1* | 1/2012 | Eguchi | H04L 12/4625 725/25 |
| 2012/0083259 A1* | 4/2012 | Chang | H04M 1/7253 455/418 |
| 2012/0254921 A1 | 10/2012 | Jeon | |
| 2012/0311430 A1 | 12/2012 | Seo et al. | |
| 2013/0016045 A1* | 1/2013 | Zhao | G06F 3/0416 345/173 |
| 2013/0093727 A1* | 4/2013 | Eriksson et al. | 345/175 |
| 2013/0148720 A1* | 6/2013 | Rabii | G06F 3/1454 375/240.12 |
| 2013/0219285 A1* | 8/2013 | Iwasaki | 715/740 |

FOREIGN PATENT DOCUMENTS

| | | |
|---|---|---|
| KR | 10-2008-0064246 A | 7/2008 |
| KR | 10-2010-0102868 A | 9/2010 |
| KR | 10-2010-0129398 A | 12/2010 |
| KR | 10-2012-0134732 A | 12/2012 |

\* cited by examiner

PORTABLE APPARATUS COMPRISING TOUCH SCREENS FOR BROWSING INFORMATION DISPLAYED ON SCREEN OF EXTERNAL APPARATUS AND METHOD FOR BROWSING INFORMATION THEREOF

CROSS-REFERENCE TO RELATED APPLICATION

This application claims the benefit under 35 U.S.C. §119 (a) of a Korean patent application filed in the Korean Intellectual Property Office on Apr. 24, 2012 and assigned Ser. No. 10-2012-0042718, the entire disclosure of which is hereby incorporated by reference.

BACKGROUND OF THE INVENTION

1. Field of the Invention

The present invention relates to an apparatus and method for browsing information displayed on the screen of an external apparatus. More particularly, the present invention relates to an apparatus and method for browsing information displayed on the screen of an external apparatus in accordance with a user gesture on the touch screen of a portable apparatus.

2. Description of the Related Art

In order to browse information displayed on the screen of an external apparatus (for example, a digital television or a personal computer) from a distance, a user uses a remote controller having four directional buttons. For instance, in order to select a specific area on the screen of an external apparatus using a pointer on the screen, a user moves the pointer to the specific area by alternately pressing up to all four directional buttons several times and presses a selection button of the remote controller once the pointer is placed on the specific area so that information connected to the specific area may be displayed on the screen of the external apparatus.

In this case, since the user may have to press all four directional buttons alternately, several times in a row, in order to move the pointer to the specific area, this causes inconvenience to the user. Therefore, an apparatus and a method for allowing a user to conveniently browse information displayed on the screen of an external apparatus from a distance are required.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention relate to browsing information displayed on the screen of an external apparatus swiftly using a portable apparatus having a touch screen. Accordingly, an aspect of the present invention provides information displayed on the screen of an external apparatus on the touch screen of a portable apparatus so as to allow a user to browse information displayed on the screen of the external apparatus swiftly using the portable apparatus.

In accordance with an aspect of the present invention, a method for browsing a web page on a screen of an external apparatus in a portable apparatus having a touch screen is provided. The method includes displaying a link area included in a web page displayed on a screen of the external apparatus on the touch screen of the portable apparatus, in response to a first gesture of a user on the touch screen of the portable apparatus, magnifying a link area displayed on the touch screen of the portable apparatus, and in response to a second gesture of the user on the magnified link area, displayed on the touch screen of the portable apparatus, transmitting information regarding displaying another web page related to the link area on the screen of the external apparatus from the portable apparatus to the external apparatus.

The displaying a link area may further include displaying part of the web page including the link area displayed on the screen of the external apparatus on the touch screen of the portable apparatus.

The transmitting of information regarding the displaying of the other web page on the screen of the external apparatus to the external apparatus may include transmitting information regarding the second gesture of the user or information regarding the link area to the external apparatus.

The method may include sensing a third gesture of the user for moving in one direction on the touch screen of the portable apparatus, and in response to the third gesture of the user on the touch screen of the portable apparatus, transmitting information regarding moving the web page displayed on a screen of the external apparatus in a same direction as the one direction to the external apparatus.

The method may include sensing a fourth gesture of the user moving in one direction on the touch screen of the portable apparatus, and in response to the fourth gesture of the user on the touch screen of the portable apparatus, transmitting information regarding moving a virtual window displayed on the screen of the external apparatus corresponding to part of the web page displayed on the touch screen of the portable apparatus in the one direction or in an opposite direction to the external apparatus.

A size of the touch screen of the portable apparatus may be smaller than a size of the screen of the external apparatus.

The first gesture may be a spread gesture representing two touch points moving apart, and the second gesture may be a tap gesture representing touching the link area displayed on the touch screen of the portable apparatus.

In accordance with another aspect of the present invention, a method for browsing a web page on a screen of an external apparatus in a portable apparatus having a touch screen is provided. The method includes displaying part of the web page displayed on the screen of the external apparatus on the touch screen of the portable apparatus, sensing a first gesture of a user on the touch screen of the portable apparatus, and in response to the sensed first gesture of the user, transmitting information regarding magnifying part of the web page displayed on the screen of the external apparatus from the portable apparatus to the external apparatus.

The method may further include sensing a second gesture of the user on the touch screen of the portable apparatus, and in response to the sensed second gesture of the user, transmitting information regarding reducing part of the web page displayed on the screen of the external apparatus from the portable apparatus to the external apparatus.

In accordance with another aspect of the present invention, a method for browsing a web page on a screen of an external apparatus in a portable apparatus having a touch screen is provided. The method includes receiving a first gesture of a user which selects one of a first search mode and a second search mode, if the first search mode is selected, transmitting from the portable apparatus to the external apparatus information regarding moving the web page displayed on a screen of the external apparatus in one direction in response to the second gesture of the user on the touch screen of the portable apparatus, and if the second search mode is selected, transmitting from the portable apparatus information regarding moving a pointer displayed on the screen of the external apparatus in one direction in response to the second gesture of the user on the touch screen of the portable apparatus.

The first gesture of the user which selects one of the first search mode and the second search mode may be a gesture of touching two touch points simultaneously.

In accordance with another aspect of the present invention, a method for browsing a web page on a screen of an external apparatus in a portable apparatus having a touch screen is provided. The method includes displaying a web page on a touch screen of the portable apparatus, in response to a first gesture of a user on the touch screen of the portable apparatus, receiving information regarding magnifying the web page including a link area displayed on the screen of the external apparatus from the portable apparatus, and magnifying the web page including the link area displayed on the screen of the external apparatus in accordance with the received information regarding magnifying a web page.

The method may further include in response to a second gesture of the user on the touch screen of the portable apparatus, receiving information regarding displaying another web page connected to the link area displayed on the screen of the external apparatus on the screen of the external apparatus from the portable apparatus, and displaying the other web page connected to the link area on the screen of the external apparatus in accordance with the received information regarding displaying the other web page connected to the link area on a screen of the external apparatus.

In accordance with another aspect of the present invention, a portable apparatus for browsing a web page on a screen of an external apparatus is provided. The portable apparatus includes a touch screen, a communication unit configured to communicate with an external apparatus, and a processor which controls the touch screen to display a link area included in a web page displayed on a screen of the external apparatus on the touch screen and to magnify a link area displayed on the touch screen in response to a first gesture of a user on the touch screen, and controls the communication unit to transmit information regarding displaying another web page related to the link area on the screen of the external apparatus to the external apparatus.

The processor may control the touch screen to display part of the other web page including the link area displayed on a screen of the external apparatus on the touch screen.

The processor may control the communication unit to transmit information regarding the second gesture of a user or information regarding the link area to the external apparatus.

The processor, if a third gesture of a user for moving in one direction on the touch screen is sensed, may control the communication unit to transmit information regarding moving a web page displayed on a screen of the external apparatus in a same direction as the one direction to the external apparatus in response to the third gesture of a user.

In accordance with another aspect of the present invention, a portable apparatus for browsing a web page on a screen of an external apparatus is provided. The portable apparatus includes a touch screen, a communication unit configured to communicate with an external apparatus, and a processor configured to control the touch screen of the portable apparatus to display part of the web page displayed on the screen of the external apparatus on the touch screen of the portable apparatus, and to control the communication unit to transmit information regarding magnifying part of the web page displayed on the screen of the external apparatus to the external apparatus if a first gesture of a user is sensed on the touch screen of the portable apparatus.

In accordance with another aspect of the present invention, a portable apparatus for browsing a web page on a screen of an external apparatus is provided. The portable apparatus includes a touch screen, a communication unit configured to communicate with the external apparatus, and a processor configured to, if a first gesture of a user for selecting the first search mode is input, control the communication unit to transmit information regarding moving a web page displayed on the screen of the external apparatus in one direction to the external apparatus in response to a second gesture of a user on the touch screen of the external apparatus, and if a first gesture of a user for selecting a second search mode is input, to control the communication unit to transmit information regarding moving a pointer displayed on a screen of the external apparatus in one direction to the external apparatus in response to a second gesture of a user on the touch screen.

In accordance with another aspect of the present invention, an external apparatus which is controlled by a portable apparatus having a touch screen is provided. The external apparatus includes a screen, configured to display a web page that is also displayed on the portable apparatus, a communication unit configured to communicate with the portable apparatus, and a processor which controls the communication unit to receive information regarding magnifying a web page including a link area displayed on a screen of the external apparatus from the portable apparatus in response to a first gesture of a user on a touch screen of the portable apparatus and controls the screen to magnify a web page including the link area included in a web page displayed on the screen in accordance with the received information regarding magnifying a web page.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, of which.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventors to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, an exemplary method for manufacturing and using the present invention will be explained. It should be noted that various exemplary embodiments described herein do not limit the present invention as long as it is recited in the claims.

A user gesture refers to motions of a user to display or control information on a touch screen using a finger (e.g., an index finger) or a thumb of a left or right hand, and may include touch, release of touch, rotation, pinch, spread, touch drag, flick, swipe, touch and hold and the like. The motion of touch may refer to a state where a finger or a thumb touches a touch screen or is very close to the touch screen.

In an exemplary embodiment of the present invention, a portable apparatus is an apparatus which is connected to an external apparatus to display information using a touch screen therein, and may include, but is not limited to, a smart phone, a mobile phone, a tablet, a Portable Multimedia Player (PMP), a Personal Digital Assistant (PDA), etc. An external apparatus is an apparatus which is connected to a portable apparatus to display information, and may include, but is not limited to, a digital television, a smart television, a Personal Computer (PC), etc., or one of the portable apparatuses described above. In general, but not necessarily, the size of the screen of the portable apparatus may be smaller than that of an external apparatus.

Figure 1:
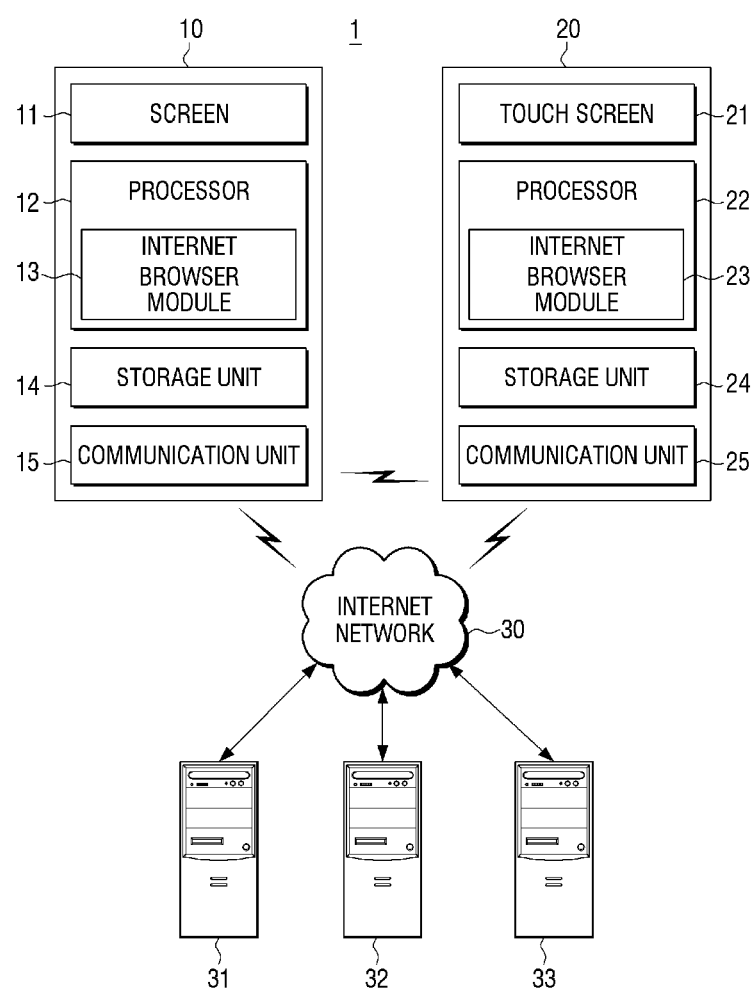
FIG. 1 is a view illustrating the configuration of a system for browsing web pages according to an exemplary embodiment of the present invention.

FIG. 1 is a view illustrating the configuration of a system according to an exemplary embodiment of the present invention.

Referring to FIG. 1, a system 1 may comprise an external apparatus 10, a portable apparatus 20 having a touch screen, and an Internet network 30 providing information to the external apparatus 10 or the portable apparatus 20. The Internet network includes a plurality of routers, and more than one server 31, 32, 33 may be connected to each router.

The external apparatus 10 may comprise a screen 11, a processor 12, a storage unit 14, and a communication unit 15.

The screen 11 receives and displays an image signal. For example, the screen 11 may display digital broadcast, contents stored in the storage unit 14 of the external apparatus 10 and information provided through the portable apparatus 20 or the Internet network 30. In addition, the external apparatus 10 may further include a touch sensor (not shown) to receive a user gesture through the screen 11.

The processor 12 controls overall operations of each component of the external apparatus 10. For example, methods required to perform operations in various exemplary embodiments may be configured as a program and stored in the storage unit 14. The processor 12 may read out a program in the storage unit 14 and control operations of each component of the external apparatus 10 in accordance with the result of reading out the program. Meanwhile, the processor 12 may include an Internet browser module 13. The Internet browser module 13 may search or manage information provided through the Internet network 30. For example, the Internet browser module 13 allows a user to view information regarding web servers 31, 32, 33 connected through the Internet network 30. In addition, the Internet browser module 13 may perform the functions of opening a web page, providing a list of recently-visited URLs, memorizing and managing the addresses of frequently-visited Internet sites, storing and printing web pages and the like.

The portable apparatus 20 may comprise a touch screen 21, a processor 22, a storage unit 24, and a communication unit 25.

The touch screen 21 may include a touch sensor. The touch screen 21 may receive and display a signal or may receive a user gesture through the touch sensor.

The processor 22 controls the overall operations of each component of the portable apparatus 20. For example, methods required to perform operations in various exemplary embodiments may be configured as a program and stored in the storage unit 24. The processor 22 may read a program from the storage unit 24 and control operations of each component of the external apparatus 20 in accordance with the result of reading the program. Meanwhile, the processor 22 may include an Internet browser module 23. The Internet browser module 23 may search or manage information provided through the Internet network 30. For example, the Internet browser module 23 allows a user to view information regarding web servers 31, 32, 33 connected through the Internet network 30. In addition, the Internet browser module 23 may perform the functions of opening a web page, providing a list of recently-visited URLs, memorizing and managing the addresses of frequently-visited Internet sites, storing and printing web pages and the like.

For example, the communication unit 15 of the external apparatus 10 and the communication unit 25 of the portable apparatus 20 may communicate with each other using wireless LAN, Bluetooth, infrared rays communication and the like. However, it is noted that the communication between these two apparatuses is not limited to the above, and the apparatuses may communicate through other forms. In addition, at least one of the communication unit 15 of the external apparatus 10 and the communication unit 25 of the portable apparatus 20 may be connected to the Internet network 30 and receive information from the web servers 31, 32, 33. Herein, the received information may include various types of contents such as web page, image, video, audio, text and the like. In this case, part of the received information may include a link area which can be connected to other information. For example, the link area may be an area including a hyperlink connecting one of another web page, image, video, audio, text and the like.

In one exemplary embodiment, if one of the communication unit 15 of the external apparatus 10 and the communication unit 25 of the portable apparatus 20 is connected to the Internet network 30, the apparatus which is connected to the Internet network 30 and receives information from the web servers 31, 32, 33 may re-transmit the received information to the apparatus which is not connected to the Internet network 30. In this case, the communication unit 15 of the external apparatus 10 and the communication unit 25 of the portable apparatus 20 may perform synchronization so that the above received information may be displayed on the screen 11 of the external apparatus 10 and the touch screen 21 of the portable apparatus 20 almost simultaneously. In another exemplary embodiment, if both the communication unit 15 of the external apparatus 10 and the communication unit 25 of the portable apparatus 20 are connected to the Internet network 30, both of the external apparatus 10 and the portable apparatus 20 may receive the same information from the Internet network 30. The information that each of the apparatuses receives may be displayed on the screen 11 of the external apparatus 10 and the touch screen 21 of the portable apparatus 20. In this case, the communication unit 15 of the external apparatus 10 and the communication unit 25 of the portable apparatus 20 may perform synchronization so that the above received information may be displayed on the screen 11 of the external apparatus 10 and the touch screen 21 of the portable apparatus 20 almost simultaneously.

Figure 2A:
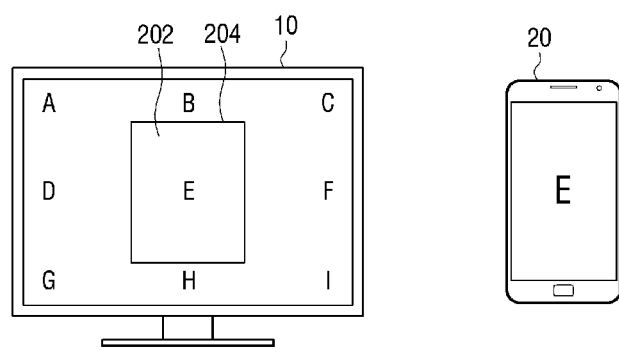
FIGS. 2A and 2B are views to explain a displaying method of a portable apparatus for browsing web pages of an external apparatus according to various exemplary embodiments of the present invention.
Figure 2B:
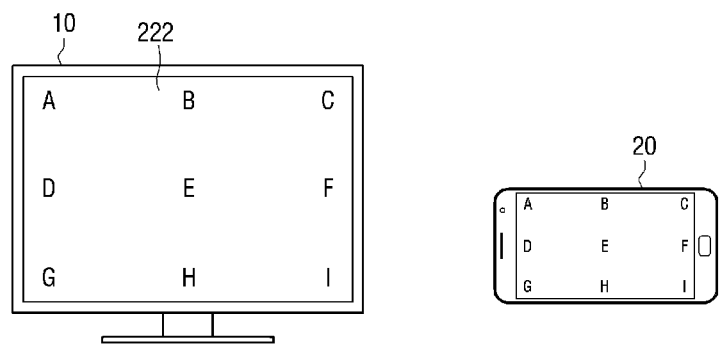

FIGS. 2A and 2B are views to explain a displaying method of a portable apparatus for browsing web pages of an external apparatus according to various exemplary embodiments of the present invention.

Referring to FIG. 2A, a partial area 202 of information displayed on the screen 11 of an external apparatus 10 may be displayed on the touch screen 21 of a portable apparatus 20. In this case, a virtual window 204 displaying the partial area 202 which is an area synchronized with the touch screen 21 may be displayed on the screen 11. The virtual window 204 may have a different contrast or a different background color on the screen 11. In general, the virtual window 204 may be located at the center of the screen 11. However, if the location of the virtual window 204 is changed by a user gesture, the virtual window 204 may be located at the center of the screen 11 again whenever information on the screen 11 is changed to other information. The size of the virtual window 204 may be predetermined at the time of releasing a product or executing an application for the first time, but it may also be changed arbitrarily by a user. The virtual window 204 may not be displayed at ordinary times and may be displayed only when a user gesture is recognized on the touch screen 21 of the portable apparatus 20. If a user gesture is no longer recognized after a predetermined time elapses, the virtual window 204 may disappear automatically.

Referring to FIG. 2B, all information displayed on the screen 11 of an external apparatus 10 may be displayed on the touch screen 21 of a portable apparatus 20. In this case, the virtual window 204 may not be displayed on the screen 11 of the external apparatus 10, and the same information 222 displayed on the screen 11 of the external apparatus 10 may be displayed on the touch screen 21 of the portable apparatus 20.

Figure 3:
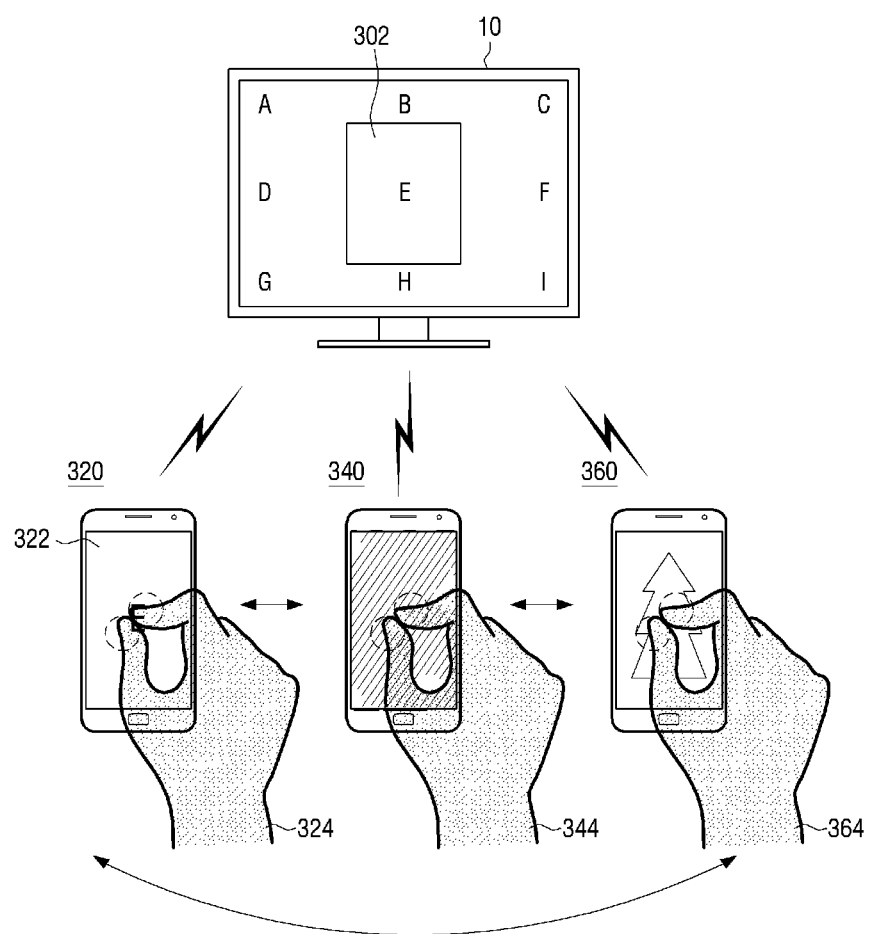
FIG. 3 is a view to explain various modes of a portable apparatus according to an exemplary embodiment of the present invention.

FIG. 3 is a view to explain various modes of a portable apparatus 20 according to an exemplary embodiment of the present invention.

Referring to the reference numeral 320 in FIG. 3, the portable apparatus 20 may provide a first mode which displays a partial area 322 of information displayed on the screen 11 of an external apparatus 10 on the touch screen 21 of the portable apparatus 20. If the first mode is selected, the portable apparatus 20 may transmit to the external apparatus 10 the information for moving a web page displayed on the screen 11 of the external apparatus 10 in one direction, in response to the first gesture of a user on the touch screen 21 of the portable apparatus 20. Accordingly, a user may browse information displayed on the screen 11 of the external apparatus 10 using the information displayed on the touch screen 21 of the portable apparatus 20. In this case, a user gesture for browsing information on the touch screen 21 of the portable apparatus 20 may include a gesture of moving information (for example, a flick gesture or a touch drag gesture) on the touch screen 21 of the portable apparatus 20 and the screen 11 of the external apparatus 10, a gesture of magnifying or reducing information (for example, a pinch gesture or a spread gesture), a gesture of selection (for example, a tap gesture), and the like.

Referring to the reference numeral 340 in FIG. 3, the portable apparatus 20 may provide a second mode which searches information displayed on the screen 11 of an external apparatus 10 on the touch screen 21 of the portable apparatus 20 without providing information displayed on the screen 11 of the external apparatus 10. If the second mode is selected, the portable apparatus 20 may transmit to the external apparatus 10 the information for moving a pointer displayed in the screen 11 of the external apparatus 10 in one direction, in response to the first gesture of a user on the touch screen 21 of the portable apparatus 20. Accordingly, a user may browse information displayed on the screen 11 of the external apparatus 10 without viewing the touch screen 21 of the portable apparatus 20. In this case, a user gesture for browsing information may include a gesture of moving information (for example, a flick gesture) on the screen 11 of the external apparatus 10, a gesture of magnifying or reducing information (for example, a pinch gesture or a spread gesture), a gesture of moving a pointer displayed on the screen 11 (for example, a touch drag gesture), a gesture of selecting a specific link displayed on the screen 11 (for example, a tap gesture), and the like.

The state where information displayed on the screen 11 of an external apparatus is not provided on the touch screen 21 may include at least one of when the touch screen 21 is off, when the displayed information is provided in a dark shadow, and when information which is not related to the displayed information is provided.

Referring to the reference numeral 360 in FIG. 3, the portable apparatus 20 may provide a third mode which displays information received from the web servers 31, 32, 33 on the touch screen 21 of the portable apparatus 20 or pre-stored information without synchronization with the external apparatus 10. In this case, the external apparatus 10 and the portable apparatus 20 are not synchronized with each other and thus, a user gesture on the touch screen 21 does not affect information displayed on the screen 10 of an external apparatus.

The first mode 320 in FIG. 3, the second mode 340 in FIG. 3 and the third mode 360 in FIG. 3 may be converted into one another in accordance with a pre-defined user gesture. For example, if a touch gesture 324 with respect to a plurality of touch points of a user is input simultaneously on the touch screen 21 in the first mode and the gesture is maintained for more than a first time (for example, for 2 seconds), the portable apparatus 20 may convert the mode from the first mode to the second mode. On the other hand, if a touch gesture 344 with respect to a plurality of touch points of a user is input simultaneously on the touch screen 21 of the portable apparatus 20 in the second mode and the gesture is maintained for more than the first time (for example, for 2 seconds), the portable apparatus 20 may convert the mode from the second mode to the first mode.

In another exemplary embodiment, if the touch gesture 344 with respect to a plurality of touch points of a user is input simultaneously on the touch screen 21 of the portable apparatus 20 in the second mode and the gesture is maintained for more than a third time (for example, for 4 seconds), the portable apparatus 20 may convert the mode from the second mode to the third mode. On the other hand, if a touch gesture 364 with respect to a plurality of touch points of a user is input simultaneously on the touch screen 21 in the third mode and the gesture is maintained for more than a second time (for example, for 2 seconds), the portable apparatus 20 may convert the mode from the third mode to the second mode.

In another exemplary embodiment, if the touch gesture 364 with respect to a plurality of touch points of a user is input simultaneously on the touch screen 21 in the third mode and the gesture is maintained for more than the third time (for example, for 6 seconds), the portable apparatus 20 may convert the mode from the third mode to the first mode. On the other hand, if a touch gesture 324 with respect to a plurality of touch points of a user is input simultaneously on the touch screen 21 in the first mode and the gesture is maintained for more than third time (for example, for 6 seconds), the portable apparatus 20 may convert the mode from the first mode to the third mode.

Further, it is noted that the period of the first time, the second time, and the third time discussed above, are merely examples and thus the time periods may be changed. Also, the gestures discussed above for changing between the screens are also exemplary embodiments and other gestures can be used.

In addition, in the above exemplary embodiments, conversion between the first mode and the second mode, conversion between the second mode and the third mode, and conversion between the third mode and the first mode are performed according to the touch time, but this is only an example. The conversion of mode may be performed using a button of the portable apparatus 20 or a menu displayed on the portable apparatus 20.

Figure 4A:
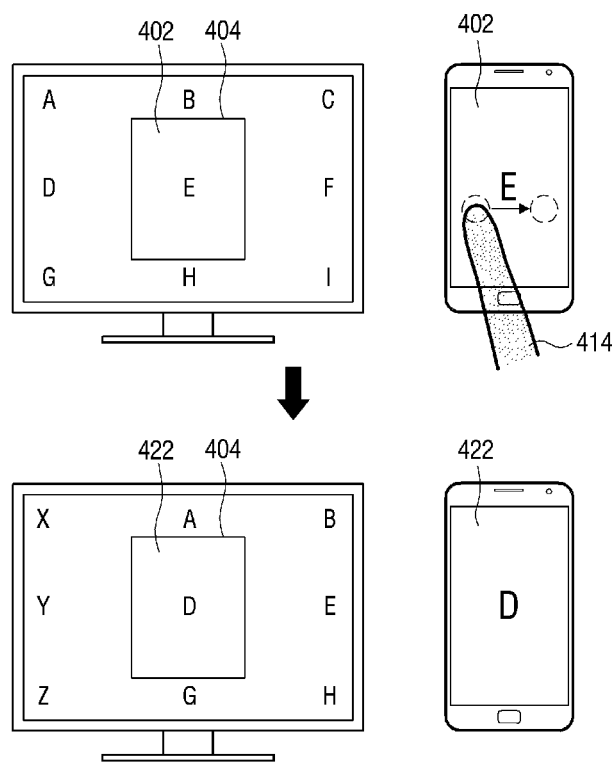
FIGS. 4A to 8C are views to explain a method for browsing web pages displayed on an external apparatus using a portable apparatus according to various exemplary embodiments of the present invention.
Figure 4B:
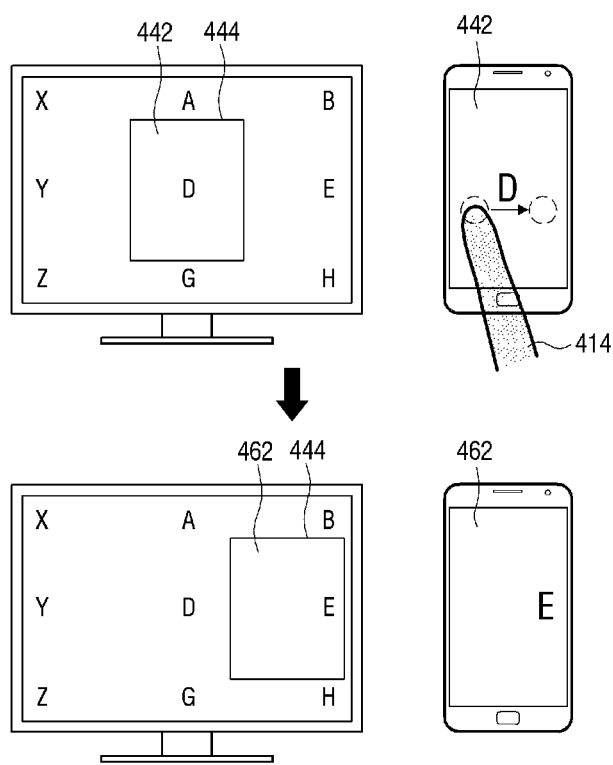

FIGS. 4A and 4B are views illustrating a process of browsing information displayed on the external apparatus 10 using the portable apparatus 20 according to an exemplary embodiment. More particularly, FIGS. 4A and 4B are views to explain a process of browsing information displayed on the external apparatus 10 in the first mode from among the modes of the portable apparatus 20 explained above with reference to FIG. 3.

Referring to FIG. 4A, if a partial area 402 of information displayed on the screen 11 of the external apparatus 10 is displayed on the touch screen 21 of the portable apparatus 20, the portable apparatus 20 may transmit the information displayed on the touch screen 21 of the portable apparatus 20 to the external apparatus 10 in response to a user gesture 414 (for example, a flick gesture or a touch drag gesture) in one direction on the touch screen 21. For example, the portable apparatus 20 may transmit information regarding the user gesture 414 (for example, type of gesture, touch location of gesture, moving direction of gesture, moving distance of gesture, moving speed of gesture, etc.) on the touch screen 21 of the portable apparatus 20 to the external apparatus 10. In addition, the portable apparatus 20 may display another area 422 of information displayed on the screen 11 of the external apparatus 10, in response to a continuous user gesture 414 on the touch screen 21 of the portable apparatus 20 in one direction.

The external apparatus 10 may receive information regarding the user gesture 414 from the portable apparatus 20, and move information displayed on the screen 11 of the external apparatus 10 in one direction in response to the user gesture 414. In this case, the location of a virtual window 404 displayed on the screen 11 may be fixed regardless of the user gesture 414, and the information in the virtual window 404 may be changed to new information 422.

Meanwhile, there is a point where new information is no longer provided as information displayed on the screen 11 moves in one direction in response to a user gesture in one direction on the touch screen. In this case, as illustrated in FIG. 4B, if a partial area 442 of information displayed on the screen 11 of the external apparatus 10 is displayed on the touch screen 21 of the portable apparatus 20, if a user gesture 414 in one direction is repeatedly performed on the touch screen 21 of the portable apparatus 20, another part 462 of the information displayed on the screen 11 of the external apparatus 20 may be displayed on the touch screen 21 of the portable apparatus 20, while the information displayed on the screen 11 of the external apparatus 10 may not be changed. In this case, the location of a virtual window 444 on the screen 11 of the external apparatus 10 may be changed in accordance with the user gesture 414 and the information in the virtual window 444 may be changed to the new information 462.

Figure 5A:
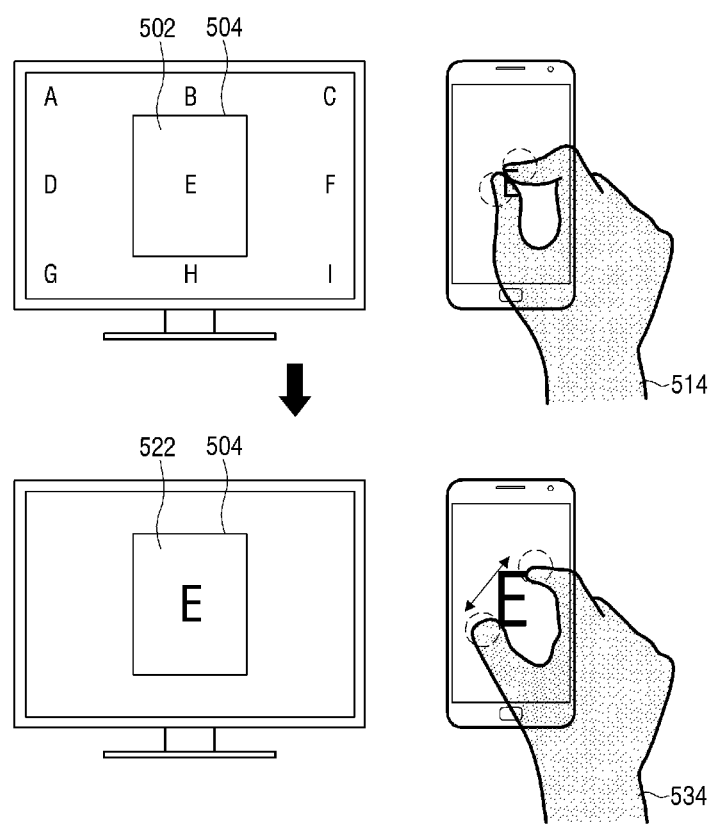
Figure 5B:
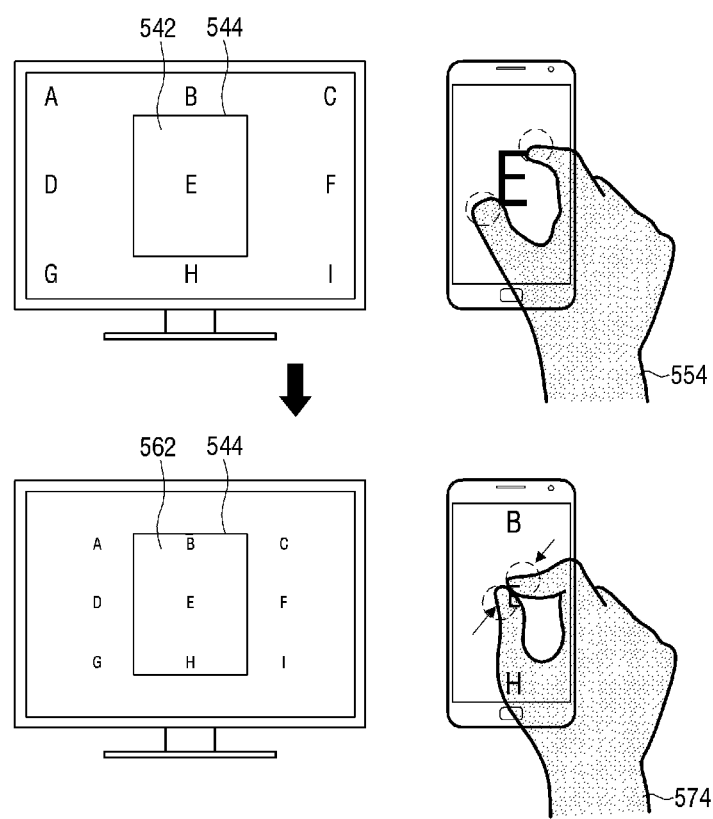

FIGS. 5A and 5B are views illustrating a process of browsing information displayed on the external apparatus 10 using the portable apparatus 20 according to another exemplary embodiment. More particularly, FIGS. 5A and 5B are views to explain a process of browsing information displayed on the external apparatus 10 in the first mode from among the modes of the portable apparatus 20 explained above with reference to FIG. 3.

Referring to FIG. 5A, if a partial area 502 of information displayed on the screen 11 of the external apparatus 10 is displayed on the touch screen 21 of the portable apparatus 20, the portable apparatus 20 may transmit information for magnifying a size of information displayed on the screen 11 of the external apparatus 10 to the external apparatus 10 in response to user gestures 514, 534 (for example, a spread gesture) in both directions on the touch screen 21 of the portable apparatus 20. For example, the portable apparatus 20 may transmit information regarding the user gestures 514, 534 (for example, type of gesture, touch location of gesture, moving speed of gesture, moving distance of gesture, moving angle of gesture, etc.) on the touch screen 21 to the external apparatus 10. In addition, the portable apparatus 20 may transmit a ratio of magnifying a specific area of displayed information as the size of information displayed on the touch screen 21 is magnified. For example, if the size of a specific area on the touch screen 21 of the portable apparatus 20 is changed from 50×50 pixel to 100×100 pixel, the portable apparatus 20 may transmit a ratio which magnifies the specific area by two times to the external apparatus 10. In addition, the portable apparatus 20 may display the information 522 in the magnified size on the screen 11 of the touch screen 21 in response to the user gestures 514, 534 in both directions at the same time.

The external apparatus 10 may receive information for magnifying information displayed on the screen 11 from the portable apparatus 20 and magnify and display the information displayed on the screen 11 of the external apparatus 10 in accordance with the user gestures 514, 534. In this case, the location of the virtual window 504 representing an area displayed on the touch screen 21 of the portable apparatus 20 may be fixed on the screen 11 regardless of the user gestures 514, 534, and the information in the virtual window 504 may be changed to the information 522 in the magnified size.

Referring to FIG. 5B, if a partial area 542 of information displayed on the screen 11 of the external apparatus 10 is displayed on the touch screen 21 of the portable apparatus 20, the portable apparatus 20 may transmit information for reducing a size of information displayed on the screen 11 of the external apparatus 10 to the external apparatus 10 in response to user gestures 554, 574 (for example, a pinch gesture) in both direction on the touch screen 21 of the portable apparatus 20. For example, the portable apparatus 20 may transmit information regarding the user gestures 554, 574 (for example, type of gesture, touch location of gesture, moving speed of gesture, moving distance of gesture, moving angle of gesture, etc.) on the touch screen 21 to the external apparatus 10. In addition, the portable apparatus 20 may transmit a ratio of reducing a specific area of displayed information as the size of information displayed on the touch screen 21 is reduced. For example, if the size of a specific area on the touch screen 21 of the portable apparatus 20 is changed from 100×100 pixel to 50×50 pixel, the portable apparatus 20 may transmit a ratio which reduces the specific area by two times to the external apparatus 10. In addition, the portable apparatus 20 may display the information 542 on the screen 11 of the external apparatus 10 in the reduced size on the touch screen 21 in response to the user gestures 554, 574 in both directions at the same time.

The external apparatus 10 may receive information for reducing information displayed on the screen 11 from the portable apparatus 20 and reduce and display the information displayed on the screen 11 of the external apparatus 10 in accordance with the user gestures 554, 574. In this case, the location of the virtual window 544 representing an area displayed on the touch screen 21 of the portable apparatus 20 may be fixed on the screen 11 regardless of the user gestures 554, 574, and the information 542 in the virtual window 544 may be changed to the information 562 in the magnified size.

Figure 6A:
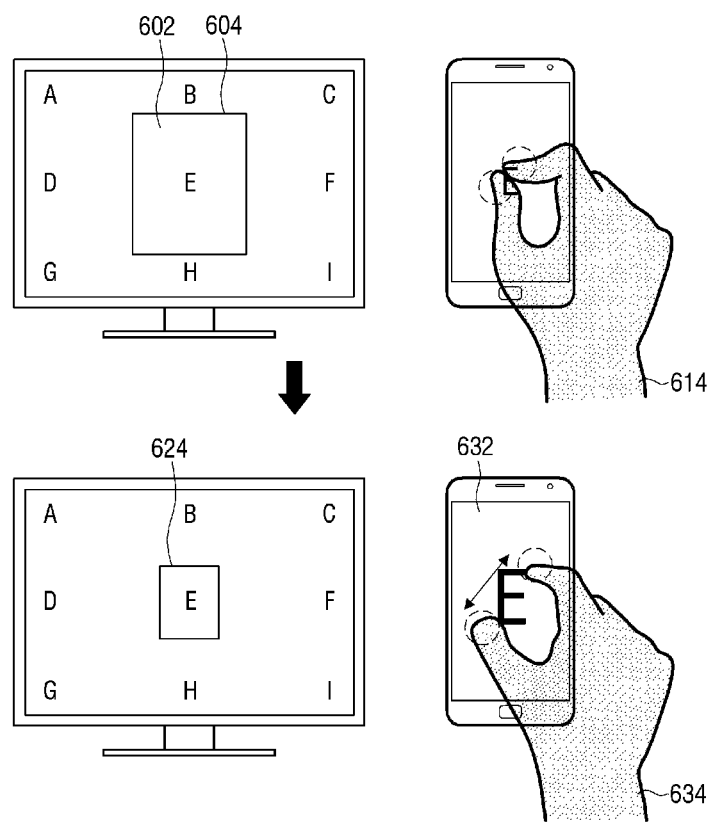
Figure 6B:
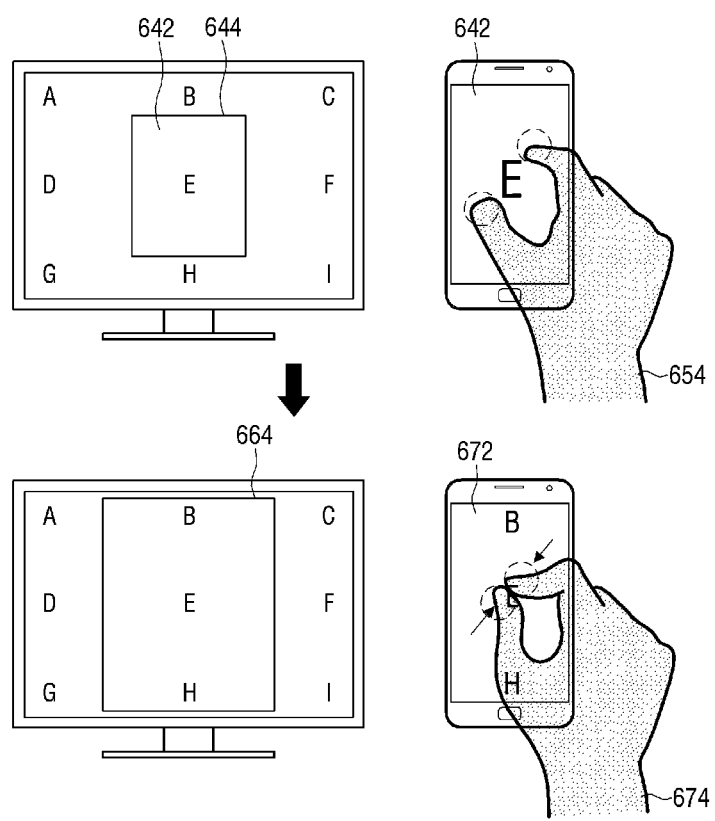

FIGS. 6A and 6B are views illustrating a process of browsing information displayed on the external apparatus 10 using the portable apparatus 20 according to another exemplary embodiment. More particularly, FIGS. 6A and 6B are views to explain a process of browsing information displayed on the external apparatus 10 in the first mode from among the modes of the portable apparatus 20 explained above with reference to FIG. 3.

Referring to FIG. 6A, if a partial area 602 of information displayed on the screen 11 of the external apparatus 10 is displayed on the touch screen 21 of the portable apparatus 20, the portable apparatus 20 may transmit information for reducing a size of a virtual window 604 displayed on the screen 11 of the external apparatus 10 to the external apparatus 10 in response to user gestures 614, 634 (for example, a spread gesture) in both direction on the touch screen 21 of the portable apparatus 20. For example, the portable apparatus 20 may transmit information regarding the user gestures 614, 634 (for example, type of gesture, touch location of gesture, moving speed of gesture, moving distance of gesture, moving angle of gesture, etc.) on the touch screen 21 to the external apparatus 10. In addition, the portable apparatus 20 may transmit a ratio of reducing the virtual window 604 displayed on the screen 11 of the external apparatus 10 as the size of information displayed on the touch screen 21 of the portable apparatus 20 is magnified. In addition, the portable apparatus 20 may display information on the screen 11 of the external apparatus 10 as information 632 in the magnified size on the touch screen 21 of the portable apparatus 20 in response to the continuous user gestures 614, 634 in both directions.

The external apparatus 10 may receive information for reducing a size of the virtual window 624 from the portable apparatus 20 and maintain the previously-displayed information regardless of the user gestures 614, 634. However, the external apparatus 10 may display the virtual window 604 for an area displayed on the touch screen 21 as the virtual window 624 in the reduced size on the screen 11 in accordance with the user gestures 614, 634.

Referring to FIG. 6B, if a partial area 642 of information displayed on the screen 11 of the external apparatus 10 is displayed on the touch screen 21 of the portable apparatus 20, the portable apparatus 20 may transmit information for magnifying a size of a virtual window 644 on the screen 11 of the external apparatus 10 to the external apparatus 10 in response to user gestures 654, 674 (for example, a pinch gesture) in both direction on the touch screen 21. For example, the portable apparatus 20 may transmit information regarding the user gestures 654, 674 (for example, type of gesture, touch location of gesture, moving speed of gesture, moving distance of gesture, moving angle of gesture, etc.) on the touch screen 21 of the portable apparatus 20 to the external apparatus 10. In addition, the portable apparatus 20 may transmit a ratio of magnifying the virtual window 644 displayed on the screen 11 as the size of information displayed on the touch screen 21 is reduced. In addition, the portable apparatus 20 may display information on the screen 11 of the external apparatus 10 as information 672 in the reduced size on the touch screen 21 in response to the continuous user gestures 654, 674 in both directions.

The external apparatus 10 may receive information for magnifying a size of the virtual window 644 from the portable apparatus 20 and maintain the previously-displayed information regardless of the user gestures 654, 674. However, the external apparatus 10 may display the virtual window 644 for an area displayed on the touch screen 21 as the virtual window 664 in the magnified size on the screen 11 in accordance with the user gestures 654, 674.

Figure 7:
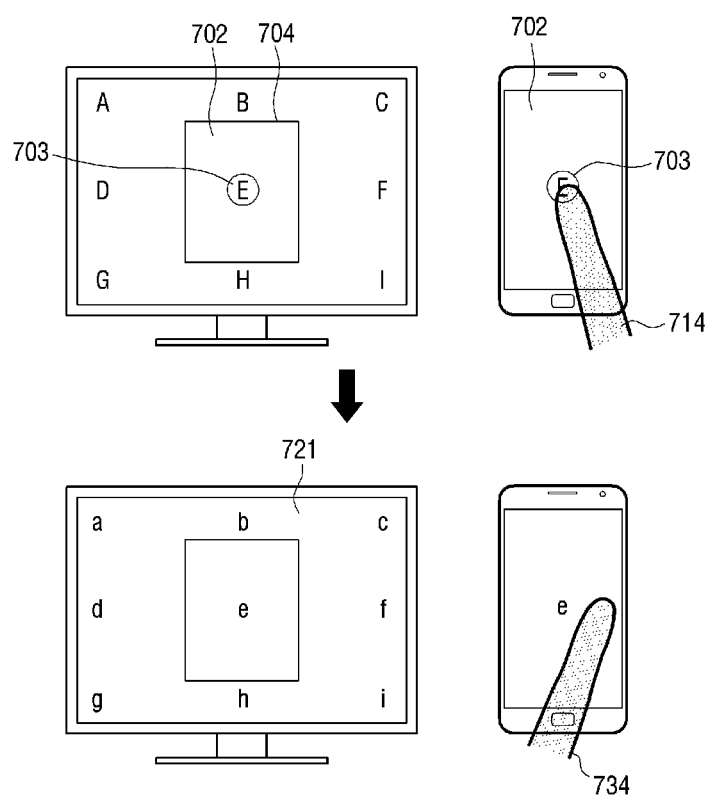

FIG. 7 is a view illustrating a process of browsing information displayed on the external apparatus 10 using the portable apparatus 20 according to another exemplary embodiment. FIG. 7 is also a view to explain a process of browsing information displayed on the external apparatus 10 in the first mode from among the modes of the portable apparatus 20 explained above with reference to FIG. 3.

Referring to FIG. 7, if a partial area 702 of information 704 displayed on the screen 11 of the external apparatus 10 is displayed on the touch screen 21 of the portable apparatus 20, the portable apparatus 20 may transmit information of displaying a web page connected to a link area 703 on the screen 11 of the external apparatus 10 to the external apparatus 10 in response to user gestures 714, 734 (for example, a tap gesture) on the link area 703 displayed on the touch screen 21. In this case, the information of displaying a web page connected to the link area 703 on the screen 11 of the external apparatus 10 may be information regarding a second gesture of a user or information regarding the link area 703. For example, the portable apparatus 20 may transmit to the external apparatus 10 the information regarding the second gesture of a user (for example, type of gesture, touch location of gesture, etc.) or the information regarding the link area 703 (for example, a web page address, etc.). At the same time, in response to the user gestures 714, 734, the portable apparatus 20 may also convert information on the touch screen 21 into information 721 connected to the link area.

The external apparatus 10 may receive information for displaying a web page connected to the link area 703 on the screen 11 of the external apparatus 10 from the portable apparatus 20 and access and display a web page connected to the link area 703. In this case, a virtual window may be positioned at the center of the screen 11 whenever information displayed on the screen 11 is converted to the connected information 721.

Figure 8A:
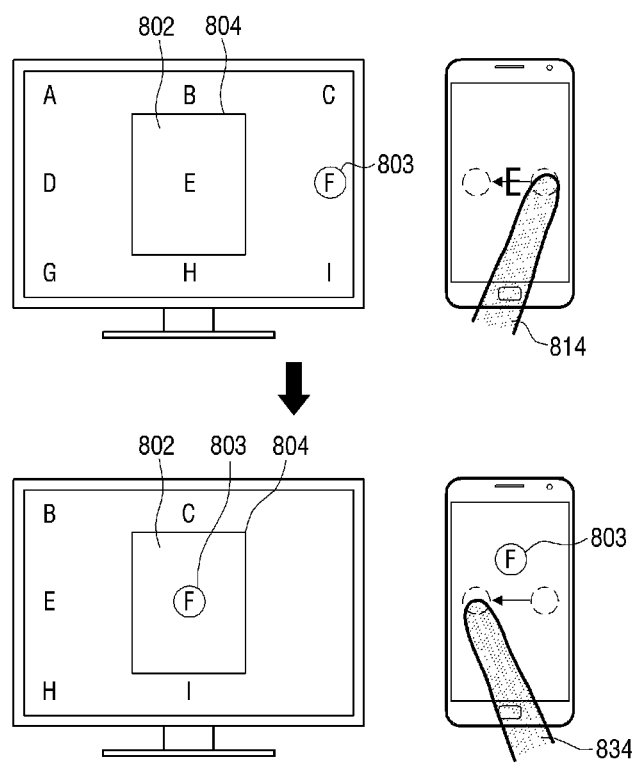
Figure 8B:
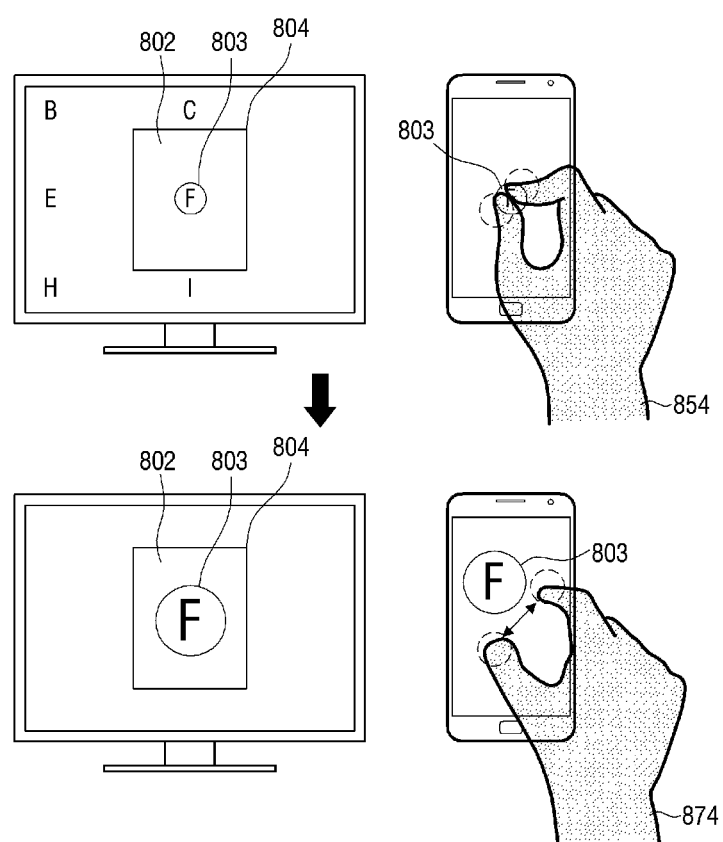

FIGS. 8A and 8B are views illustrating a process of browsing information displayed on an external apparatus using a portable apparatus according to another exemplary embodiment.

Referring to FIG. 8A, if a partial area 802 of information displayed on the screen 11 of the external apparatus 10 and a link area 803 thereon are included, the information displayed on the screen 11 may be moved in one direction in response to user gestures 814, 834 (for example, a flick gesture or a touch drag gesture) in one direction on the touch screen 21 of the portable apparatus 20. At the same time, in response to the user gestures 814, 834, the link area 803 displayed on the screen 11 may be displayed on the touch screen 21 of the portable apparatus 20.

Referring to FIG. 8B, at least the partial area 802 of the information displayed on the screen 11 and the link area 803 included in at least the partial area 802 are displayed, the partial area 802 of the information displayed on the screen 11 and the link area 803 included in at least the partial area 802 may be magnified in response to user gestures 854, 874 (for example, a spread gesture) on the touch screen 21. At the same time, the partial area 802 of the information displayed on the touch screen 21 and the link area 803 included in at least the partial area 802 may be magnified.

Figure 8C:
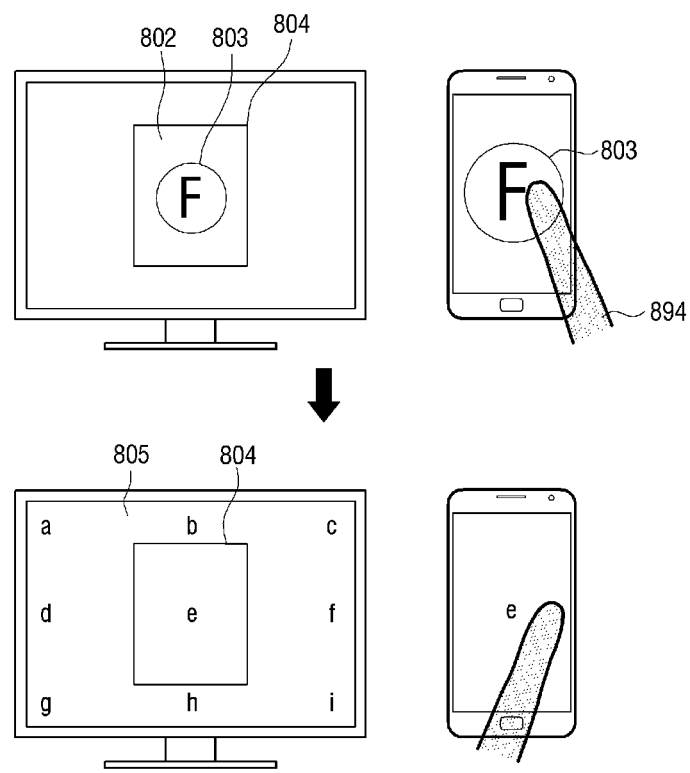

Referring to FIG. 8C, if the partial area 802 of information magnified on the screen 11 and the magnified link area 803 are displayed, the information displayed on the screen 11 may be converted to information 805 (for example, a linked web page) connected to the link area 803 on the touch screen 21 of the portable apparatus 20 in response to a user gesture 894 (for example, a tap gesture) on the magnified link area 803. In this case, a virtual window 804 may be positioned at the center of the screen 11 whenever information displayed on the screen 11 is converted to the connected information.

As described above, according to various exemplary embodiments, information displayed on the screen of an external apparatus 10 may be browsed swiftly and conveniently using a portable apparatus 20 having a touch screen.

Hereinafter, a method for browsing a web page on the screen 11 of the external apparatus 10 using the external apparatus 10 and the portable apparatus 20 according to an exemplary embodiment will be explained with reference to FIGS. 9 to 12.

Figure 9:
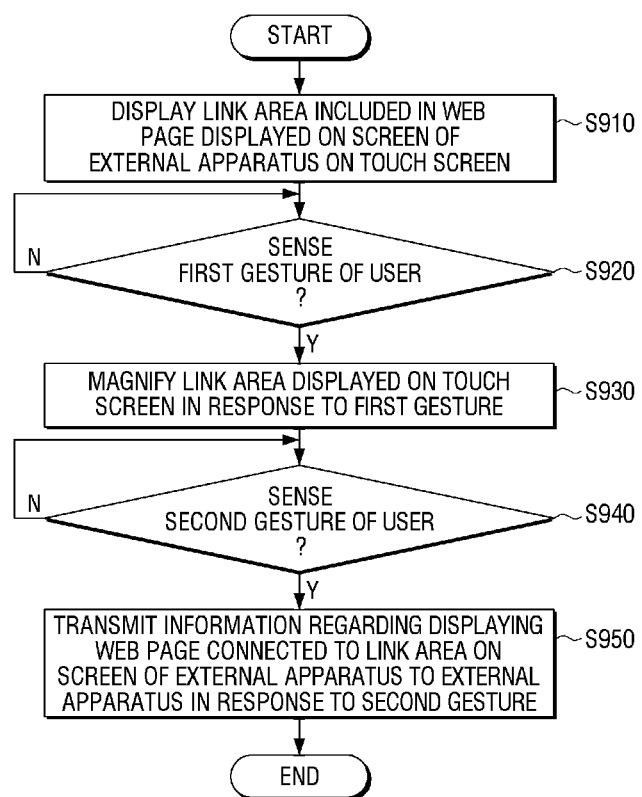
FIGS. 9 to 12 are flowcharts to explain a method for browsing web pages displayed on an external apparatus using a portable apparatus and the external apparatus.

FIG. 9 is a flowchart to explain a method in which the portable apparatus 20 having the touch screen 21 browses web pages displayed on the screen 11 of the external apparatus 10 according to an exemplary embodiment.

Referring to FIG. 9, the portable apparatus 20 displays a link area included in a web page displayed on a screen of the external apparatus 10 on the touch screen in step S910. In this case, the portable apparatus 20 and the external apparatus 10 are synchronized with each other, and the external apparatus 10 may display a virtual window on an area displayed on the touch screen 21 of the portable apparatus 20 as illustrated in FIG. 2A.

Subsequently, the portable apparatus 20 senses a first gesture of a user through the touch screen 21 in step S920. The first gesture of a user may be a spread gesture representing two touch points moving apart.

If the first gesture of a user is sensed (i.e., step S920-Y), the portable apparatus 20 magnifies a link area displayed on the touch screen in response to the first gesture in step S930. In this case, the portable apparatus 20 transmits information of magnifying the link area to the external apparatus 10, and the external apparatus 10 also changes a display screen as illustrated in FIG. 5A or FIG. 6A.

Subsequently, the portable apparatus 20 senses a second gesture of a user through the touch screen 21 in step S940. In this case, the second gesture of a user may be a tap gesture representing touching a link area.

If the second gesture of a user is sensed (i.e., step S940-Y), the portable apparatus 20 transmits information for displaying a web page linked to a link area on the screen of the external apparatus 10 to the external apparatus 10 in response to the second gesture in step S950. In this case, the information for displaying a web page linked to a link area on the screen 11 of the external apparatus 10 may be information regarding the second gesture of a user or information regarding the link area 703. For example, the portable apparatus 20 may transmit information regarding the second gesture of a user (for example, type of gesture, touch location of gesture, etc.) or information regarding the link area 703 (for example, a web page address, etc.) to the external apparatus 10. At the same time, in response to the second gesture of a user, the portable apparatus 20 may also convert information on the touch screen 21 into the information 721 connected to the link area. In addition, the external apparatus 10 may receive information for displaying a web page connected to a link area on the screen 11 of the external apparatus 10 from the portable apparatus 20 and access and display the web page connected to the link area.

Figure 10:
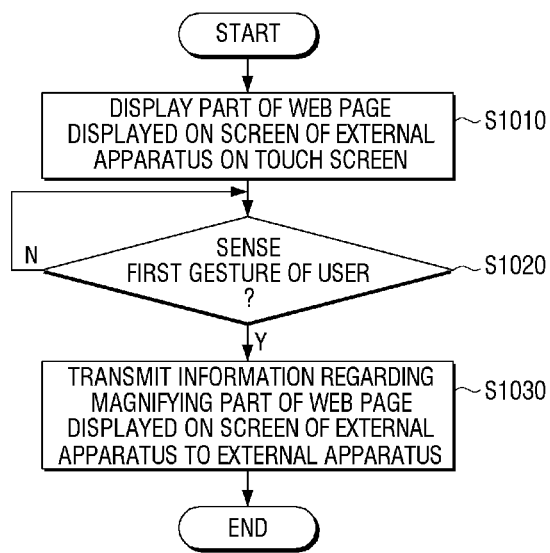

FIG. 10 is a flowchart to explain a method in which the portable apparatus 20 having the touch screen 21 browses web pages displayed on the screen 11 of the external apparatus 10 according to another exemplary embodiment.

Referring to FIG. 10, the portable apparatus 20 displays a partial area of a web page displayed on a screen of the external apparatus 10 on the touch screen 21 in step S1010. In this case, the partial area of a web page may include a link area which is linked to another web page.

Subsequently, the portable apparatus 20 determines whether a first gesture of a user is sensed in step S1020. In this case, the first gesture of a user may be a spread gesture representing two objects (for example, two fingers of a user) moving apart.

If the first gesture of the user is sensed in the portable apparatus 20, the portable apparatus 20 transmits information for magnifying part of a web page displayed on the screen 11 of the external apparatus 10 to the external apparatus 10 in step S1030.

Meanwhile, in the exemplary embodiment, the portable apparatus 20 transmits information for magnifying part of a web page to the external apparatus 10 when the first gesture of a user is sensed, but this is only an example. If the second gesture of a user (for example, a pinch gesture) is sensed on the touch screen 21 of the portable apparatus 20, the portable apparatus 20 may transmit information for reducing part of a web page to the external apparatus 10.

Figure 11:
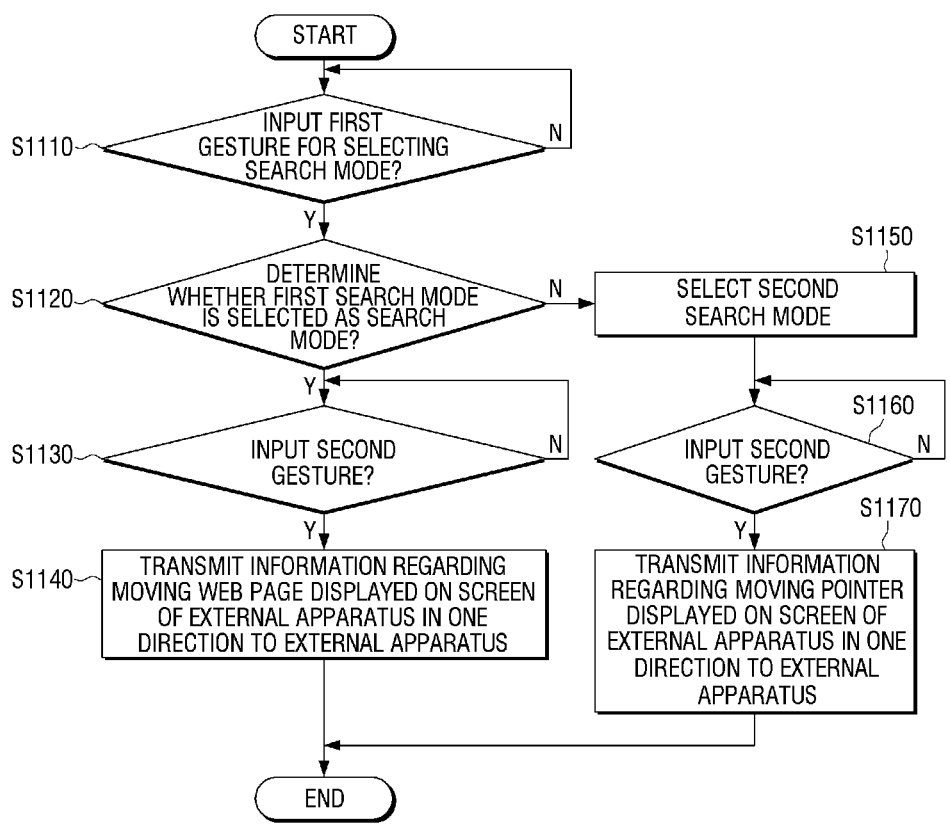

FIG. 11 is a flowchart to explain different methods for browsing web pages displayed on the screen 11 of the external apparatus 10 depending on modes according to an exemplary embodiment.

Referring to FIG. 11, the portable apparatus 20 receives the first gesture for selecting a search mode to browse web pages displayed on the screen 11 of the external apparatus 10 in step S1110. In this case, the first gesture for selecting a search mode may be a gesture of touching two touch points simultaneously.

If the first gesture is input (i.e., step S1110-Y), the portable apparatus 20 determines whether a first search mode is selected as a search mode in step S1120. The method in which the portable apparatus 20 selects a search mode has already been explained above with reference to FIG. 3, so further description will not be provided. In this case, the portable apparatus 20 may select one of the first search mode and the second search mode according to the first gesture. However, this is only an example, and another search mode may be selected.

If the first search mode is selected (i.e., step S1120-Y), the portable apparatus 20 determines whether the second gesture is input in step S1130. In this case, the second gesture may be a drag gesture.

If the second gesture is input (i.e., step S1130-Y), the portable apparatus 20 transmits information for moving a web page displayed on the screen 11 of the external apparatus 10 in one direction to the external apparatus 10 in step S1140. The information of moving a web page displayed on the screen 11 of the external apparatus 10 may correspond to the direction of the second gesture.

However, if the first search mode is not selected (i.e., step S1120-N), the portable apparatus 20 selects the second search mode in step S1150.

Subsequently, the portable apparatus 20 determines whether the second gesture is input in step S1160. In this case, the second gesture may be a drag gesture.

If the second gesture is input (i.e., step S1160-Y), the portable apparatus 20 transmits information for moving a pointer displayed on the screen 11 of the external apparatus 10 in one direction to the external apparatus 10 in step S1170.

Figure 12:
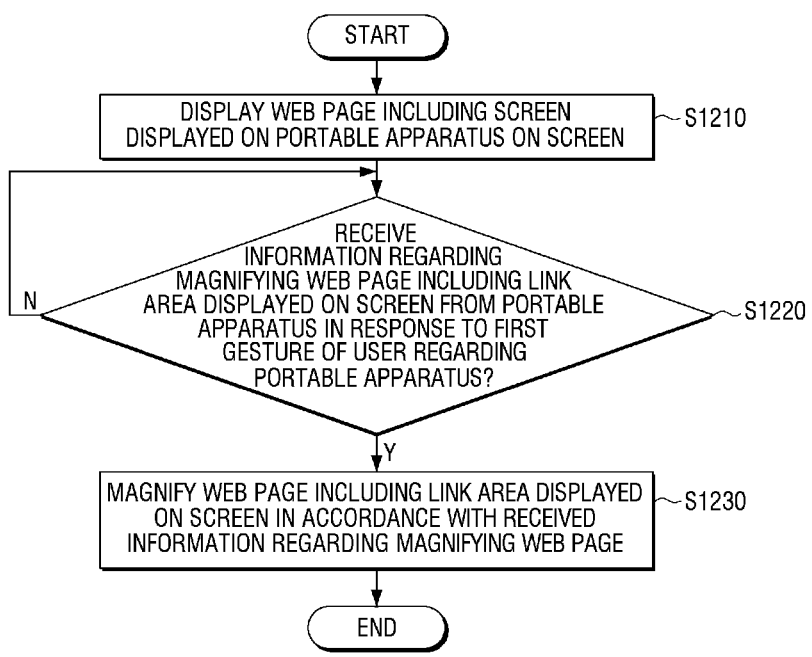

FIG. 12 is a flowchart to explain a method of browsing web pages of the external apparatus 10 controlled by the portable apparatus 20 according to an exemplary embodiment.

Referring to FIG. 12, the external apparatus 10 displays a web page including a screen displayed on the portable apparatus 20 on the screen 10 in step 1210. In this case, the external apparatus 10 may receive information regarding the web page from the portable apparatus 20.

In response to the first gesture of a user regarding the portable apparatus 20, the external apparatus 10 determines whether information of magnifying a web page including a link area displayed on a screen is received from the portable apparatus 20 in step S1220. In this case, the first gesture of a user may be a spread gesture.

If information of magnifying a web page is received from the portable apparatus 20 (i.e., step S1220-Y), the external apparatus 10 magnifies the web page displayed on the screen 11 in accordance with the received information of magnifying the web page in step S1230.

However, this is only an example, and if information for reducing a web page including a link area displayed on the screen 11 is received from the portable apparatus 20 in response to the second gesture of a user regarding the portable apparatus 20, the external apparatus 10 may reduce the web page displayed on the screen in accordance with the received information of reducing the web page. As described above, as web pages displayed on the external apparatus 10 are browsed using the portable apparatus 20 and the external apparatus 10, users may browse information displayed on the screen of the external apparatus more swiftly and conveniently.

Meanwhile, the above-mentioned method of displaying information in an information displaying apparatus according to various exemplary embodiments may be embodied as a program command executable through various computer means and recorded in a recording medium readable by a computer. In this case, the recording medium readable by a computer may include a program command, a data file, and data configuration alone or in combination. Meanwhile, the program command recorded in the recording medium may be designed and configured for exemplary embodiments of the present inventive concept or may be known to and commonly used by those skilled in the field of computer software industry.

The recording medium readable by a computer includes magnetic media such as a hard disk, a floppy disk, and a magnetic tape, optical media such as a CD-ROM and a DVD, magneto-optical media such as a floptical disk, and a hardware apparatus specially designed to store and perform a program command such as ROM, RAM, and a flash memory. Meanwhile, such a recording medium may be a transmission medium such as an optical or metal strip and waveguide including carrier wave which transmits a signal designating a program command, data configuration, and so forth.

In addition, the program command includes a machine code composed by a compiler and a high-level language code executable by a computer using an interpreter. The above-described hardware apparatus may be configured to operate as more than one software module to perform operations of the present inventive concept and vice versa.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for browsing a web page on a screen of an external apparatus through a portable apparatus, the portable apparatus having a touch screen, the method comprising:
    displaying a link area on the touch screen of the portable apparatus;
    transmitting information for displaying a web page including the link area on the screen of the external apparatus;
    in response to a first gesture of a user on the touch screen, magnifying the link area and transmitting information for magnifying the screen based on the first gesture, wherein the first gesture is a spread gesture representing two touch points moving apart; and
    in response to a second gesture of the user on the magnified link area, transmitting information for displaying another web page related to the magnified link area from the portable apparatus to the external apparatus, wherein the second gesture is a tap gesture representing touching the magnified link area;

sensing a third gesture on the touch screen of the portable apparatus;

in response to the third gesture, transmitting movement information to the external apparatus instructing the external apparatus to move the other web page displayed on the screen in a direction of the third gesture;

sensing a fourth gesture of the user moving in a direction on the touch screen; and in response to the fourth gesture, transmitting information regarding moving a virtual window displayed on the screen corresponding to part of the other web page in the direction of the fourth gesture or in an opposite direction of the fourth gesture, wherein a size of the touch screen is smaller than a size of the screen, and wherein the virtual window is displayed on a portion of the screen of the external apparatus to be visually distinguishable from a remaining portion of the screen.

2. The method of claim 1, wherein the displaying of the link area further comprises:

displaying part of the web page including the link area displayed on the screen of the external apparatus on the touch screen of the portable apparatus.

3. The method of claim 1, wherein the transmitting of the information for displaying of the other web page comprises:

transmitting information regarding the second gesture of the user or information regarding the link area to the external apparatus.

4. The method of claim 1, further comprising:

sensing a fifth gesture of the user on the touch screen of the portable apparatus; and in response to the fifth gesture, transmitting information for demagnifying the screen to the external apparatus.

5. A method for browsing a web page displayed on a screen of an external apparatus, the method comprising:

receiving information from a portable apparatus for displaying a link area on the screen of the external apparatus;

displaying the link area including a web page;

in response to a first gesture of a user on a touch screen of the portable apparatus, receiving information from the portable apparatus for magnifying the screen of the external apparatus, wherein the first gesture is a spread gesture representing two touch points moving apart;

magnifying the link area;

in response to a second gesture of the user on the touch screen, receiving information regarding displaying another web page related to the magnified link area from the portable apparatus, wherein the second gesture is a tap gesture representing touching the magnified link area, in response to a third gesture of the user on the touch screen, receiving movement information instructing the external apparatus to move the other web page displayed on the screen in a direction of the third gesture;

moving the other web page displayed on the screen in the direction of the third gesture, in response to a fourth gesture of the user on the touch screen, receiving information regarding moving a virtual window displayed on the screen corresponding to part of the other web page in the direction of the fourth gesture or in an opposite direction of the fourth gesture, wherein a size of the touch screen is smaller than a size of the screen, and wherein the virtual window is displayed on a portion of the screen of the external apparatus to be visually distinguishable from a remaining portion of the screen.

6. A portable apparatus for browsing a web page displayed on a screen of an external apparatus, the portable apparatus comprising:

a touch screen;

a communication unit configured to communicate with the external apparatus; and a processor configured to:

control the touch screen to display a link area on the touch screen, transmit information for displaying a web page including the link area on the screen of the external apparatus;

in response to a first gesture of a user on the touch screen, magnify the link area and transmit information for magnifying the screen based on the first gesture, wherein the first gesture is a spread gesture representing two touch points moving apart; and in response to a second gesture of the user on the magnified link area, transmit information for displaying another web page related to the magnified link area to the external apparatus, wherein the second gesture is a tap gesture representing touching the magnified link area;

sense a third gesture on the touch screen of the portable apparatus;

in response to the third gesture, transmit movement information to the external apparatus instructing the external apparatus to move the other web page displayed on the screen in a direction of the third gesture;

sense a fourth gesture of the user moving in a direction on the touch screen; and in response to the fourth gesture, transmit information regarding moving a virtual window displayed on the screen corresponding to part of the other web page in the direction of the fourth gesture or in an opposite direction of the fourth gesture wherein the virtual window is displayed on a portion of the screen of the external apparatus to be visually distinguishable from a remaining portion of the screen.

7. An external apparatus which is controlled by a portable apparatus having a touch screen, the external apparatus comprising:

a screen;

a communication unit configured to communicate with the portable apparatus; and a processor configured to:

control the communication unit to receive information from a portable apparatus for displaying a link area on the screen of the external apparatus;

control the display to display the link area including a web page;

control the communication unit to, in response to a first gesture of a user on a touch screen of the portable apparatus, receive information from the portable apparatus for magnifying the screen of the external apparatus, wherein the first gesture is a spread gesture representing two touch points moving apart;

magnify the link area; control the communication unit to, in response to a second gesture of the user on the touch screen, receive information regarding displaying another web page related to the magnified link area from the portable apparatus, wherein the second gesture is a tap gesture representing touching the magnified link area, control the communication unit to, in response to a third gesture of the user on the touch screen, receive movement information instructing the external apparatus to move the other web page displayed on the screen in a direction of the third gesture; moving the other web page displayed on the screen in the direction of the third gesture, control the communication unit to, in response to a fourth gesture of the user on the touch screen, receive information regarding moving a virtual window displayed on the screen corresponding to part of the other web page in the direction of the fourth gesture or in an opposite direction of the fourth gesture, wherein a size of the touch screen is smaller than a size of the screen, and wherein the virtual window is displayed on a portion of the screen of the external apparatus to be visually distinguishable from a remaining portion of the screen.

* * * * *